G. W. WEYMAN.

Plunger for Pressing Glass.

No. 8,799. Reissued July 8, 1879.

Witnesses:

A. P. Grant,

W. F. Kicher

Inventor:

Geo. W. Weyman, by John A. Wiedersheim.

ATTORNEY.

N. PETERS, PHOTO-LITHOGRAPHER, WASHINGTON, D. C.

UNITED STATES PATENT OFFICE.

GEORGE W. WEYMAN, OF PHILADELPHIA, PENNSYLVANIA.

IMPROVEMENT IN PLUNGERS FOR PRESSING GLASS.

Specification forming part of Letters Patent No. 206,157, dated July 16, 1878; Reissue No. 8,799, dated July 8, 1879; application filed June 5, 1879.

*To all whom it may concern:*

Be it known that I, GEORGE W. WEYMAN, of the city and county of Philadelphia, and State of Pennsylvania, have invented a new and useful Improvement in Plungers for Pressing Glass, &c., which improvement is fully set forth in the following specification and accompanying drawings, in which—

Figure 1:
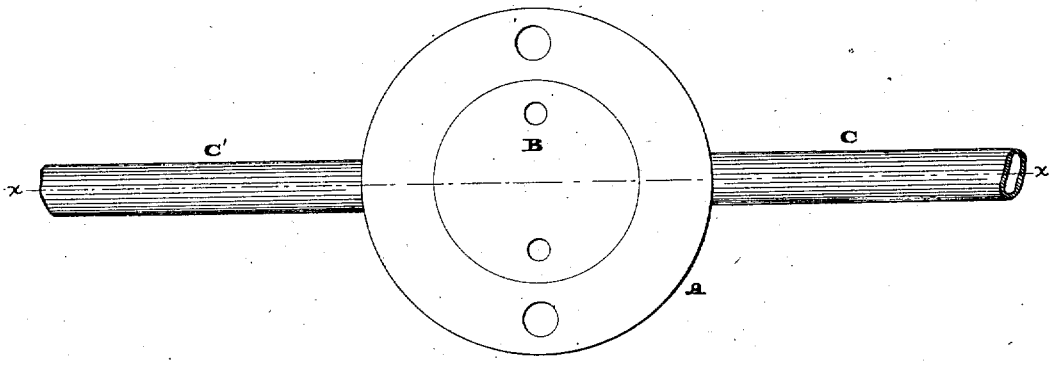
Figure 2:
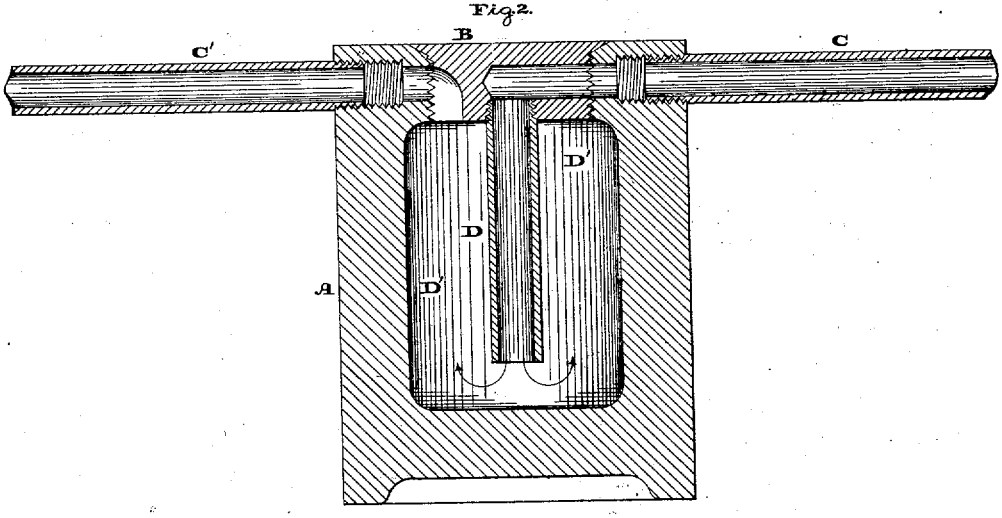
Figure 3:
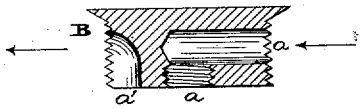

Figure 1 is a top or plan view of the plunger embodying my invention. Fig. 2 is a central vertical section thereof. Fig. 3 is a sectional view of the cap detached.

Similar letters of reference indicate corresponding parts in the several figures.

My invention consists of a plunger for pressing glass, &c., having a chamber which is adapted to receive cool water or air, and discharge the same in the form of steam or hot air without permitting the striking back of the steam or hot air, whereby the flow of the cooling-fluid is not obstructed and bursting of the plunger is prevented.

It also consists of a cap which closes the top of the chamber of the plunger, and prevents the overbubbling and escape of the heated fluid, and serves to direct the cool fluid into and hot fluid from the chamber.

Referring to the drawings, A represents a plunger for pressing articles of glassware and other substances in a hot state, as usual. The plunger is constructed hollow, so as to form a chamber, D′, and provided with pipes C C′, which are fitted to the upper end of the plunger A, preferably at opposite points.

B represents a cap, which closes the top of the chamber D′, and is formed with channels or ways *a a′*, with which communicate, respectively, the pipes C C′. From said cap B is suspended a pipe, D, which projects into the chamber D′ toward the bottom thereof.

The operation is as follows: Cool or fresh water or air is admitted into the pipe C and directed into the chamber D′, where it flashes into steam, or is formed into highly-heated air, which immediately expands and rises in the chamber D′, and seeks an outlet through the channel *a′* at the top thereof.

It will be noticed that there is no direct communication of the generated steam or hot air with the channel *a*, wherefore the steam or hot air is prevented striking back into the inlet C, the effect whereof is to allow an unobstructed flow of cool or fresh water or air into the chamber D′, and relieve said chamber of sudden pressure, so that bursting of the plunger is prevented.

It is evident that the plunger is kept comparatively cool in service, the advantages of which are appreciable by those familiar with the art.

The cap B, closing the top of the plunger, prevents escape of steam or hot air thereat, and protects the workmen from scalding and burning.

As reciprocating motions are imparted to the plunger, the pipes C C′ will be flexible for at least a portion of their length.

I am aware that it is not new to employ a hollow plunger which is occupied by a screw-plug having an inlet and outlet passage; but in the same there is no provision made for preventing the striking back of the steam, as in my case; hence I have made an improvement in the art.

Having thus described my invention, what I claim as new, and desire to secure by Letters Patent, is—

1. A plunger for pressing glass, &c., formed with a chamber which is provided with fluid inlet and outlet passages, substantially as described, whereby steam or hot air generated in the chamber is prevented striking back into the inlet, as stated.

2. The plunger A, for pressing glass, &c., formed with an expansion-chamber, D′, for the steam or hot air generated therein, as stated.

3. The plunger provided with a cap, B, having channels *a a′* and a depending pipe, D, substantially as and for the purpose set forth.

4. The pipe D, projecting toward the bottom of the chamber D′, and the cap B, having an outlet, *a′*, communicating with the top of said chamber, substantially as and for the purpose set forth.

GEORGE W. WEYMAN.

Witnesses:

JOHN A. WIEDERSHEIM,

A. P. GRANT.